United States Patent
Sakamoto et al.

(10) Patent No.: US 10,162,361 B2
(45) Date of Patent: Dec. 25, 2018

(54) VEHICLE CONTROL DEVICE

(71) Applicant: HONDA MOTOR CO., LTD., Tokyo (JP)

(72) Inventors: Yosuke Sakamoto, Wako (JP); Hiroyuki Koibuchi, Wako (JP); Daisuke Kondo, Wako (JP); Yuki Nakada, Wako (JP); Yoshifumi Banno, Wako (JP); Yuki Kizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/433,169

(22) Filed: Feb. 15, 2017

(65) Prior Publication Data
US 2017/0235313 A1    Aug. 17, 2017

(30) Foreign Application Priority Data

Feb. 15, 2016  (JP) ................. 2016-025904

(51) Int. Cl.
*G05D 1/02* (2006.01)
*B62D 6/00* (2006.01)
(Continued)

(52) U.S. Cl.
CPC .......... *G05D 1/0246* (2013.01); *B60W 30/12* (2013.01); *B62D 6/001* (2013.01); *G01C 21/26* (2013.01);
(Continued)

(58) Field of Classification Search
CPC .. G05D 1/0212; G05D 1/0231; G05D 1/0246; G05D 1/0274; G05D 2201/0213;
(Continued)

(56) References Cited

U.S. PATENT DOCUMENTS 5,390,118 A * 2/1995 Margolis et al. ........ B62D 1/28
701/23
8,406,957 B2 * 3/2013 Kim ..................... B62D 15/025
701/41

(Continued)

FOREIGN PATENT DOCUMENTS

JP    2005-306283 A    11/2005
JP    2015-197829 A    11/2015

*Primary Examiner* — Dale W Hilgendorf
(74) *Attorney, Agent, or Firm* — Westerman, Hattori, Daniels & Adrian, LLP (57) ABSTRACT

A steering control unit performs lane keeping control to cause a steering system to operate to reduce a distance between a width-direction center position of a lane and a position where the vehicle is traveling in the lane on the basis of a recognized state of the lane obtained by a lane recognizing unit. A road condition determining unit determines whether the road on which the vehicle is traveling is a straight road. A lane keeping responsivity setting unit sets, when it is determined by the road condition determining unit that the road on which the vehicle is traveling is a straight road, responsivity of the lane keeping control to the distance to be lower than responsivity set when it is determined that the road on which the vehicle is traveling is not a straight road.

8 Claims, 5 Drawing Sheets

(51) Int. Cl.
  *G01C 21/26* (2006.01)
  *G08G 1/04* (2006.01)
  *B60W 30/12* (2006.01)
  *G01S 19/42* (2010.01)
  *B62D 15/02* (2006.01)
  *G08G 1/16* (2006.01)
  *B60W 50/00* (2006.01)

(52) U.S. Cl.
  CPC ......... *G05D 1/0212* (2013.01); *G05D 1/0231* (2013.01); *G05D 1/0274* (2013.01); *G08G 1/04* (2013.01); *B60W 2050/0083* (2013.01); *B60W 2420/42* (2013.01); *B60W 2520/16* (2013.01); *B60W 2540/18* (2013.01); *B60W 2550/142* (2013.01); *B60W 2550/146* (2013.01); *B60W 2550/402* (2013.01); *B62D 15/02* (2013.01); *B62D 15/025* (2013.01); *G01S 19/42* (2013.01); *G05D 2201/0213* (2013.01); *G08G 1/167* (2013.01)

(58) Field of Classification Search
  CPC .......... G01C 21/26; G08G 1/04; B62D 6/001; G01S 19/42
  See application file for complete search history.

(56) References Cited

U.S. PATENT DOCUMENTS

| | | | |
|---|---|---|---|
| 8,473,144 B1 * | 6/2013 | Dolgov et al. ....... | G01D 1/0212 701/23 |
| 2015/0278612 A1 | 10/2015 | Sakamoto | |
| 2017/0129535 A1 * | 5/2017 | You et al. ............ | G05D 1/0246 |

* cited by examiner

VEHICLE CONTROL DEVICE

CROSS REFERENCES TO RELATED APPLICATIONS

The present application claims priority under 35 U.S.C. § 119 to Japanese Patent Application No. 2016-025904, filed Feb. 15, 2016, entitled "Vehicle Keeping Control Device." The contents of this application are incorporated herein by reference in their entirety.

TECHNICAL FIELD

The present disclosure relates to a vehicle control device that performs control to keep a vehicle within a lane where the vehicle is traveling.

BACKGROUND

In the related art, there are vehicle control devices that control, upon detecting deviation of a vehicle from substantially the center position of a lane where the vehicle is traveling on the basis of an image captured by a camera mounted in the vehicle, the steering system so that the vehicle returns to substantially the center position of the lane (see, for example, Japanese Unexamined Patent Application Publication No. 2005-306283).

Specifically, the vehicle control device described in Japanese Unexamined Patent Application Publication No. 2005-306283 includes a steering torque sensor that detects a steering torque corresponding to a steering operation of the driver. The vehicle control device adjusts the reaction force of the steering system for keeping the vehicle substantially at the center position of the lane in accordance with the magnitude of the steering torque corresponding to the steering operation, thereby allowing the driver to perform the steering operation without feeling differently from the familiar manner when changing the lane, for example.

SUMMARY

According to study by the inventors, the position of the vehicle in the lane is detected by recognizing the positions of lane markings or the like from an image captured by a camera mounted in the vehicle; however, how the lane markings look through the camera changes depending on pitching of the vehicle and the incline of the road. The inventors have found that control (lane keeping control) for keeping the vehicle substantially at the center of the lane sometimes makes the behavior of the vehicle unstable because of such a change in how the lane markings look.

The present application describes, for example, a vehicle control device that makes it less likely that the behavior of the vehicle becomes unstable due to lane keeping control while the vehicle is traveling on a straight road.

A vehicle control device according to a first aspect of the present disclosure includes a lane recognizing unit, a steering control unit, a road condition determining unit, and a lane keeping responsivity setting unit. The lane recognizing unit recognizes a lane where a vehicle is traveling from an image captured by a camera mounted in the vehicle. The steering control unit performs lane keeping control to cause a steering system of the vehicle to operate to reduce a distance between a width-direction center position of the lane and a position where the vehicle is traveling in the lane on the basis of a recognized state of the lane obtained by the lane recognizing unit. The road condition determining unit determines whether a road on which the vehicle is traveling is a straight road. The lane keeping responsivity setting unit sets, when it is determined by the road condition determining unit that the road on which the vehicle is traveling is a straight road, responsivity of the lane keeping control to the distance to be lower than responsivity set when it is determined by the road condition determining unit that the road on which the vehicle is traveling is not a straight road.

According to the first aspect, lane keeping control for keeping the vehicle substantially at the center position of the lane where the vehicle is traveling is performed by the steering control unit on the basis of a lane recognition result obtained by the lane recognizing unit. How the lane looks in images captured by a camera changes depending on pitching of the vehicle and the incline of the road even if the vehicle is traveling on a straight road. If a distance between the width-direction center position of the lane recognized by the steering control unit and the position of the vehicle frequently changes in response to such a change in how the lane looks, lane keeping control would be executed even though it is not necessary to perform it because the vehicle is traveling on a straight road, thus which May make the behavior of the vehicle unstable.

Accordingly, when it is determined by the road condition determining unit that the road on which the vehicle is traveling is a straight road, the lane keeping responsivity setting unit sets responsivity of the lane keeping control to the distance between the width-direction center position of the lane and the position of the vehicle to be lower than responsivity set when it is determined that the road on which the vehicle is traveling is not a straight road. This configuration successfully makes it less likely that the behavior of the vehicle becomes unstable due to lane keeping control and the vehicle traveling condition while the vehicle is traveling on a straight road.

In addition, the vehicle control device may further include a vehicle location detection unit and a map data obtaining unit. The vehicle location detection unit detects a current location of the vehicle. The map data obtaining unit accesses a map database storing map data and obtains the map data. The road condition determining unit may determine whether the road on which the vehicle is traveling is a straight road on the basis of the map data obtained by the map data obtaining unit and including the current location of the vehicle detected by the vehicle location detection unit.

According to this configuration, the vehicle control device further includes the vehicle location detection unit and the map data obtaining unit. Thus, this configuration allows the road condition determining unit to easily determine whether the road on which the vehicle is traveling is a straight road from map data of the road on which the vehicle is traveling.

In addition, the road condition determining unit may determine that the road on which the vehicle is traveling is a straight road when an amount of change in a position of a vanishing point of the road in a horizontal direction in time-series images captured by the camera is smaller than or equal to a predetermined first value.

This configuration allows the road condition determining unit to more easily determine whether the road on which the vehicle is traveling is a straight road by focusing on the fact that the position of the vanishing point of the road in the horizontal direction barely changes in time-series images captured by the camera while the vehicle is traveling on a straight road, even if pitching of the vehicle or the incline of the road changes.

In addition, the lane keeping responsivity setting unit may set, when conditions are met, the responsivity of the lane keeping control to the distance to be lower than responsivity set when the conditions are not met. The conditions are that it is determined by the road condition determining unit that the road on which the vehicle is traveling is a straight road and that the distance is smaller than or equal to a predetermined second value.

According to this configuration, the responsivity of the lane keeping control is set to be lower when the vehicle is traveling substantially at the width-direction center position of the lane and the necessity for the lane keeping control is low. In this way, this configuration more effectively makes it less likely that the behavior of the vehicle becomes unstable due to the lane keeping control while the vehicle is traveling on a straight road.

A vehicle control device according to a second aspect of the present disclosure includes a lane recognizing unit, a steering control unit, and a lane keeping responsivity setting unit. The lane recognizing unit recognizes a lane where the vehicle is traveling from an image captured by a camera mounted in the vehicle. The steering control unit performs lane keeping control to cause a steering system of the vehicle to operate to reduce a distance between a width-direction center position of the lane and a position of the vehicle on the basis of a recognized state of the lane obtained by the lane recognizing unit while the vehicle is traveling on a road. The lane keeping responsivity setting unit sets, when an amount of change in a position of a vanishing point of the road in a horizontal direction in time-series images captured by the camera is smaller than or equal to a predetermined value, responsivity of the lane keeping control to the distance to be lower than responsivity set when the amount of change is larger than the predetermined value.

According to the second aspect, the position of the vanishing point of the road in the horizontal direction barely changes in time-series images captured by the camera while the vehicle is traveling on a straight road, even if pitching of the vehicle or the incline of the road changes. Thus, when this amount of change is smaller than or equal to a predetermined value (i.e., when it is expected that the vehicle is traveling on a straight road), the steering control unit sets the responsivity of the lane keeping control to the distance between the width-direction center position of the lane and the position of the vehicle to be lower than responsivity set when the amount of change is larger than the predetermined value. In this way, this configuration successfully makes it less likely that the behavior of the vehicle becomes unstable due to the lane keeping control and the vehicle traveling condition while the vehicle is traveling on a straight road.

BRIEF DESCRIPTION OF THE DRAWINGS

The advantages of the disclosure will become apparent in the following description taken in conjunction with the following drawings.

FIGS. 5A to 5C are explanatory diagrams of how the position of the vanishing point changes due to pitching of the vehicle, specifically, FIG. 5A illustrates the case where the vehicle does not pitch, FIG. 5B illustrates the case where the vehicle pitches down, and FIG. 5O illustrates the case where the vehicle pitches up.

DETAILED DESCRIPTION

Embodiments of the present disclosure will be described with reference to FIGS. 1 to 5C.

1. Configuration of Vehicle Control Device

Figure 1:
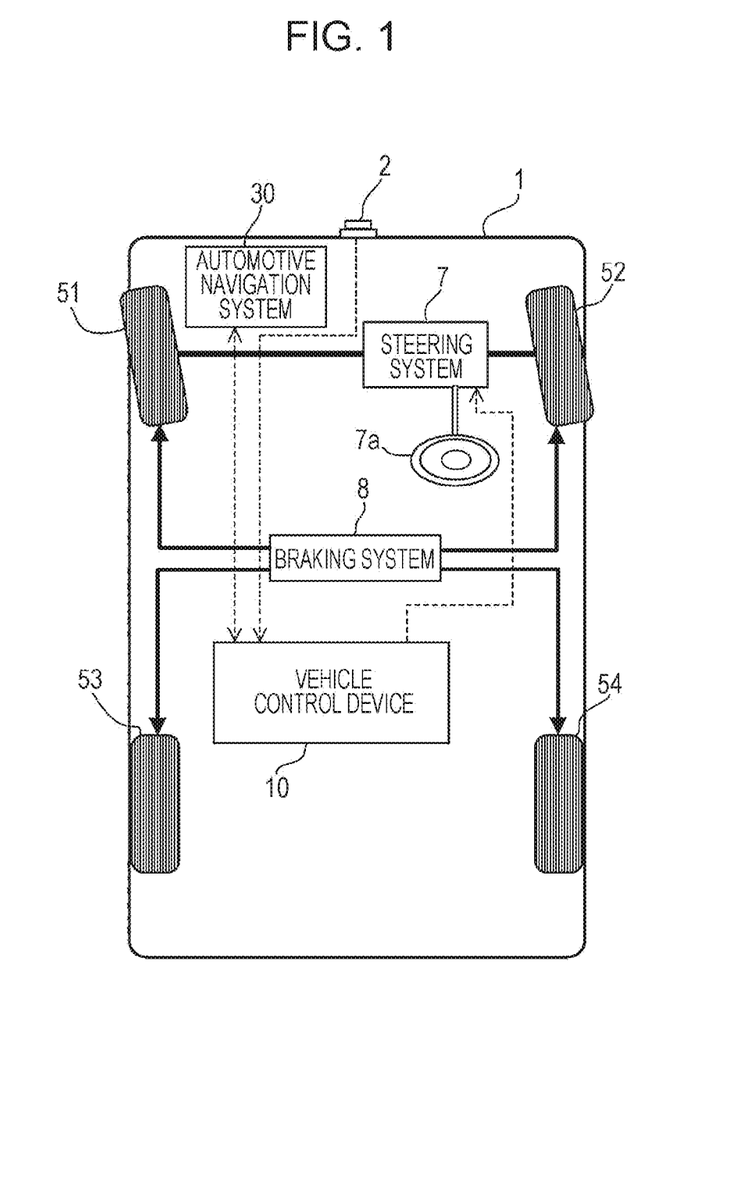
FIG. 1 is a schematic diagram of a vehicle in which a vehicle control device is mounted.

Referring to FIG. 1, a vehicle control device 10 according to an embodiment is mounted in a vehicle 1 which includes a camera 2 that captures an image of a view in front of the vehicle 1, a steering system 7 including a steering wheel 7a, a braking system 8, and an automotive navigation system 30 (having a function of a map data obtaining unit of an embodiment of the present disclosure).

The steering system 7 changes the directions of front wheels (steered wheels) 51 and 52 out of wheels 51 to 54 of the vehicle 1. The braking system 8 brakes rotations of the wheels 51 to 54 to decelerate the vehicle 1. The vehicle control device 10 controls the overall action of the vehicle 1.

Figure 2:
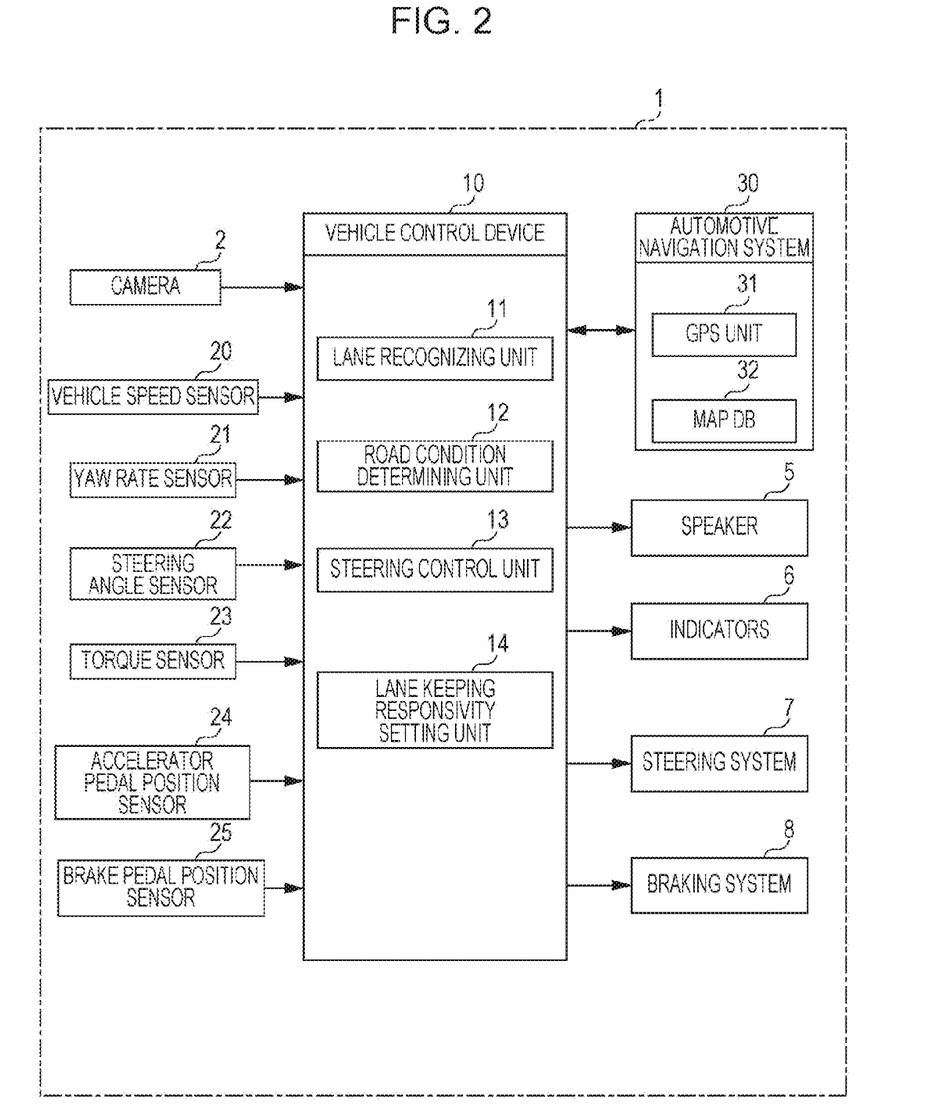
FIG. 2 is a control block diagram of the vehicle control device.

Referring next to FIG. 2, the vehicle control device 10 is an electronic circuit unit including a central processing unit (CPU), a memory, and an interface circuit, which are not illustrated. The CPU executes a program for controlling the vehicle 1 stored in the memory, thereby functioning as a lane recognizing unit 11, a road condition determining unit 12, a steering control unit 13, and a lane keeping responsivity setting unit 14. The vehicle control device 10 may be an Electronic Control Unit (ECU).

The camera 2 captures images of a view in front of the vehicle 1, and such captured images are input to the vehicle control device 10. The vehicle 1 also includes a vehicle speed sensor 20, a yaw rate sensor 21, a steering angle sensor 22 that detects steering angles of the steered wheels 51 and 52, a torque sensor 23 that detects an operation torque applied to the steering wheel 7a by the driver, an accelerator pedal position sensor 24 that detects the operation state of an accelerator pedal (not illustrated), and a brake pedal position sensor 25 that detects the operation state of a brake pedal (not illustrated). Detection signals obtained by these sensors are also input to the vehicle control device 10.

The vehicle control device 10 controls actions of the steering system 7, the braking system 8, and a driving system (not illustrated) on the basis of these detection signals.

In addition, actions of a speaker 5, indicators the steering system 7, the braking system 8, and the automotive navigation system 30 are controlled on the basis of control signals output from the vehicle control device 10. The automotive navigation system 30 includes a global positioning system (GPS) unit 31 (corresponding to a vehicle location detection unit of an embodiment of the present disclosure) that detects the current location of the vehicle 1 and a map database (DB) 32 that stores map data. The automotive navigation system 30 guides the driver to the destination.

2. Lane Keeping Control

A lane keeping control process performed by the vehicle control device 10 will be described next in accordance with a flowchart illustrated in FIG. 3.

Figure 3:
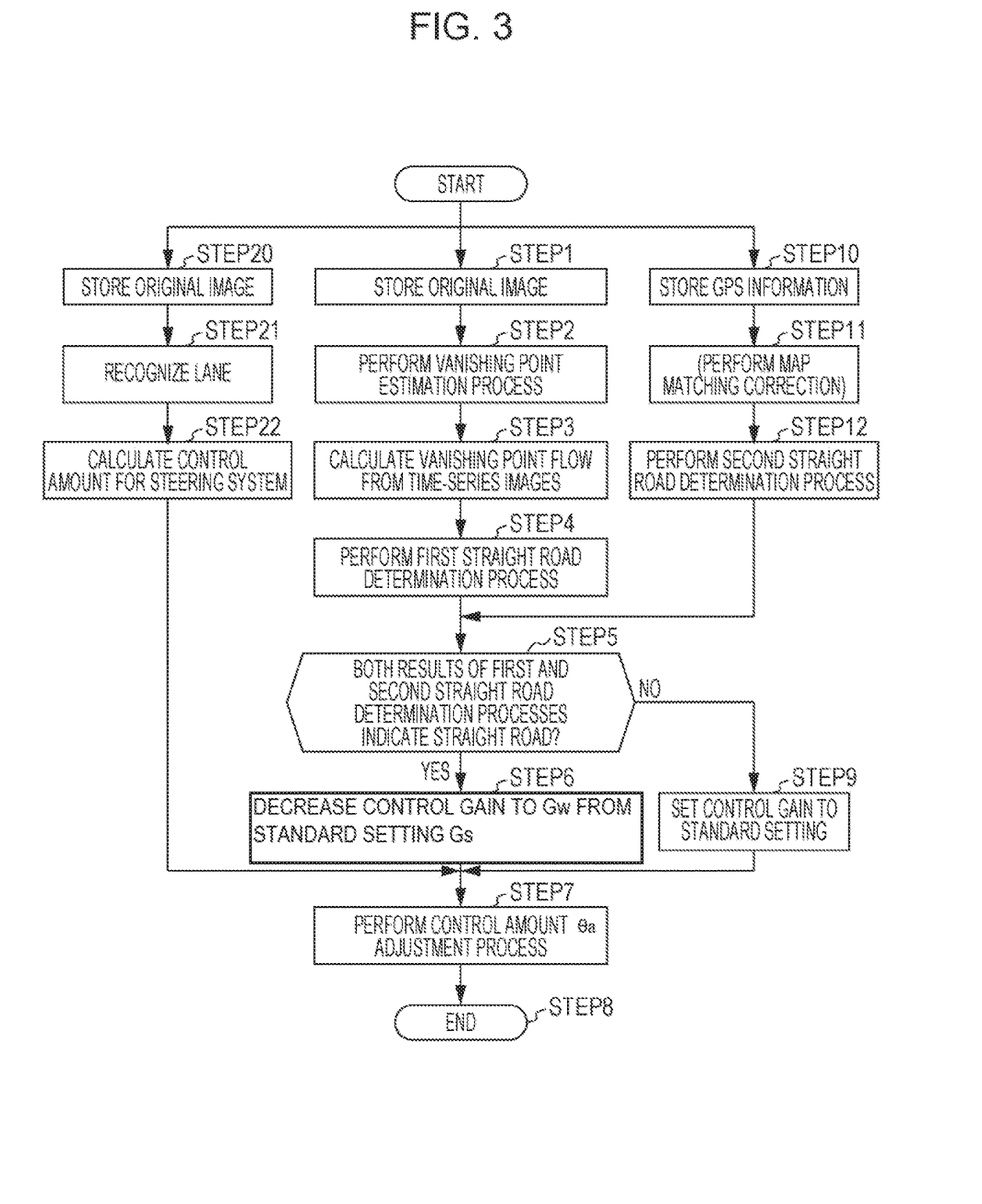
FIG. 3 is a flowchart of a control amount adjustment process during lane keeping control.

STEPs 20 and 21 of FIG. 3 are processing performed by the lane recognizing unit 11. In STEP 20, the lane recognizing unit 11 stores an image captured by the camera 2 in the memory. In STEP 21, the lane recognizing unit 11 performs processing such as edge point extraction on the captured image to extract lane markings (such as while lines, yellow lines, and Botts' dots). The lane marking extraction processing can be performed by using a technique of the related art, for example, a technique described in Japanese Unexamined Patent Application Publication No. 2015-197829 (also United States Patent Application Publication No. 20150278612), the entire contents of which are incorporated herein by reference.

The lane recognizing unit 11 then performs inverse projection transformation from the coordinate system of the camera to the coordinate system of the real space on image portions including the respective lane markings to recognize the positions of the respective lane markings relative to the vehicle 1 in the real space. In this way, the lane recognizing unit 11 recognizes the lane where the vehicle 1 is traveling.

Figure 4:
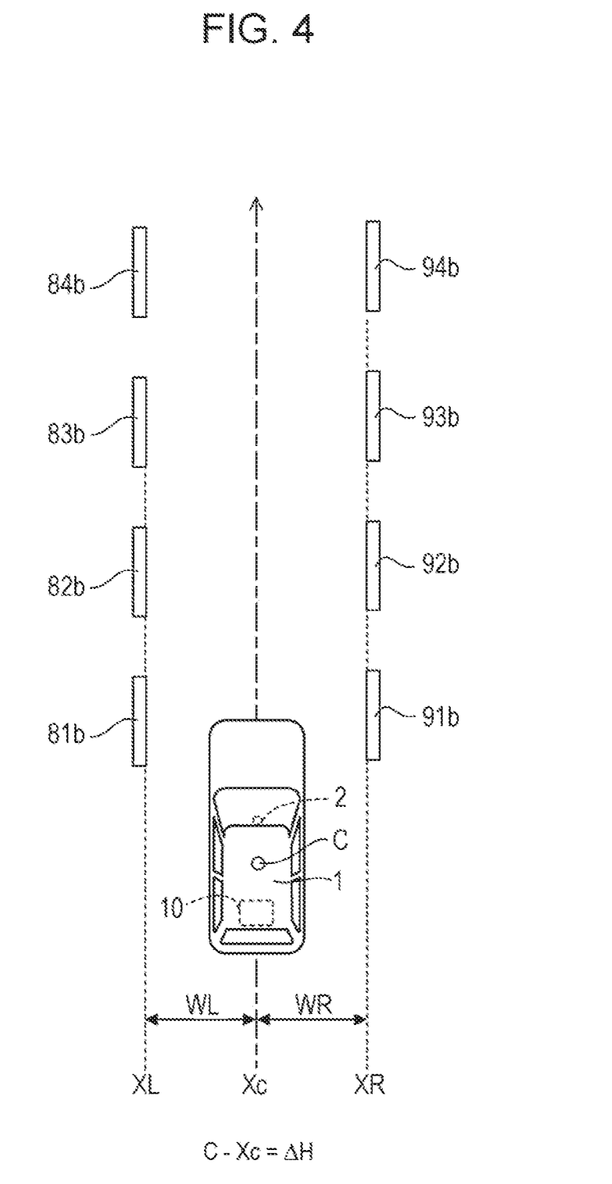
FIG. 4 is an explanatory diagram of lane keeping control.

The next step, i.e., STEP 22, is processing performed by the steering control unit 13. As illustrated in FIG. 4, left lane markings 81b to 84b and right lane markings 91b to 94b define the lane where the vehicle 1 is traveling. In STEP 22, the steering control unit 13 recognizes, as the width-direction center position of the lane, a center position Xc between an inner end position XL of the left lane markings 81b to 84b and an inner end position XR of the right lane markings 91b to 94b.

The steering control unit 13 compares a distance ΔH between the center position Xc of the lane and a width-direction center position C of the vehicle 1 with a permissible (threshold) range that is set in advance. Upon the distance ΔH exceeding the permissible range, the steering control unit 13 calculates a control amount (steering angle) θa of the steering system 7 for bringing the vehicle 1 closer to the center position Xc (decreasing the distance ΔH) and keeping the vehicle 1 substantially at the center of the lane. The process then proceeds to STEP 7.

STEPs 1 to 4 and STEPs 10 to 12 of FIG. 3 are processing performed by the road condition determining unit 12. The road condition determining unit 12 performs the processing of STEPS 1 to 4 and the processing of STEPs 10 to 12 in parallel.

STEPs 1 to 4 are processing for determining whether the road on which the vehicle 1 is traveling is a straight road on the basis of time-series images captured by the camera 2. In STEP 1, the road condition determining unit 12 stores images (original images) captured by the camera 2 in the memory.

Figure 5A:
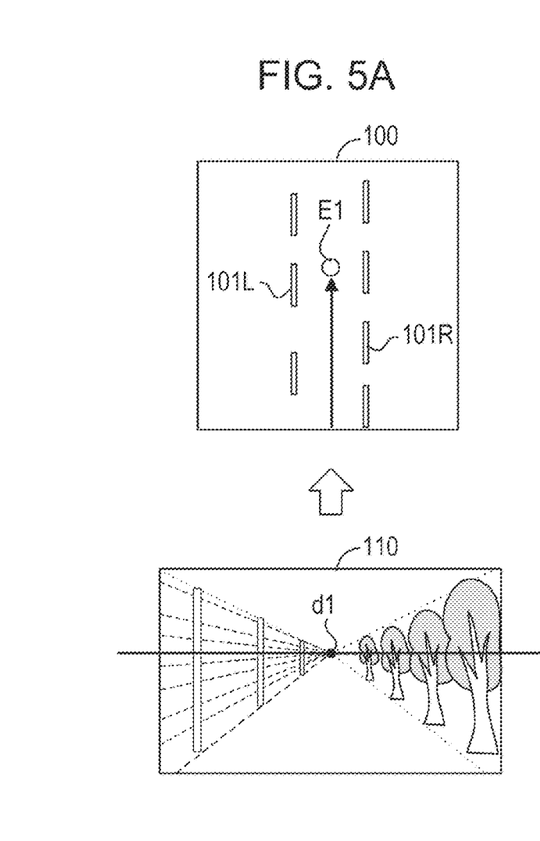

In the next step, i.e., STEP 2, the road condition determining unit 12 estimates the vanishing point in the captured images. FIG. 5A illustrates a captured image 110 obtained when the vehicle 1 is traveling on a flat road without pitching and an overhead view 100 of the lane obtained when such a state is transformed to the real-space coordinate system. The captured image 110 includes a vanishing point d1, and the position of the vanishing point d1 in the vertical direction is denoted by L. In the overhead view 100, left lane makings 101L and right lane markings 1018 of the lane are substantially parallel to each other.

Figure 5B:
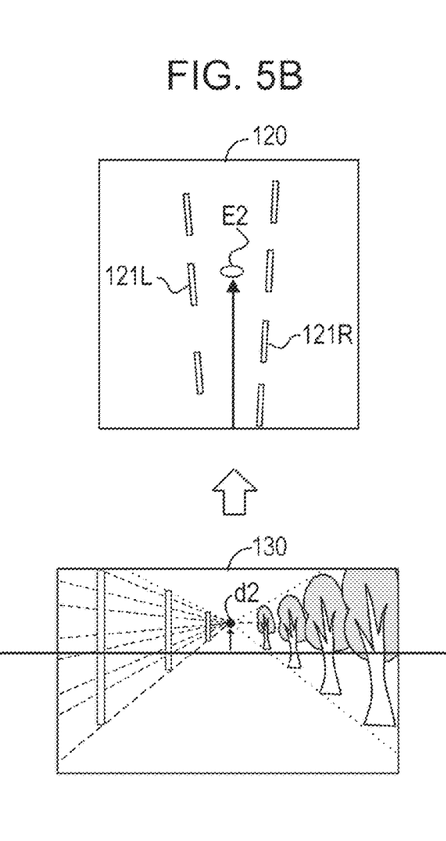

In addition, FIG. 5B illustrates a captured image 130 obtained when the vehicle 1 is pitching down or the vehicle 1 is traveling downhill and an overhead view 120 of the lane obtained when such a state is transformed to the real-space coordinate system. The captured image 130 includes a vanishing point d2, and the position of the vanishing point d2 changes to be located upper than the line L. In addition, the distance between left lane markings 121L and right lane markings 121R of the lane gradually increases in the overhead view 120.

Figure 5C:
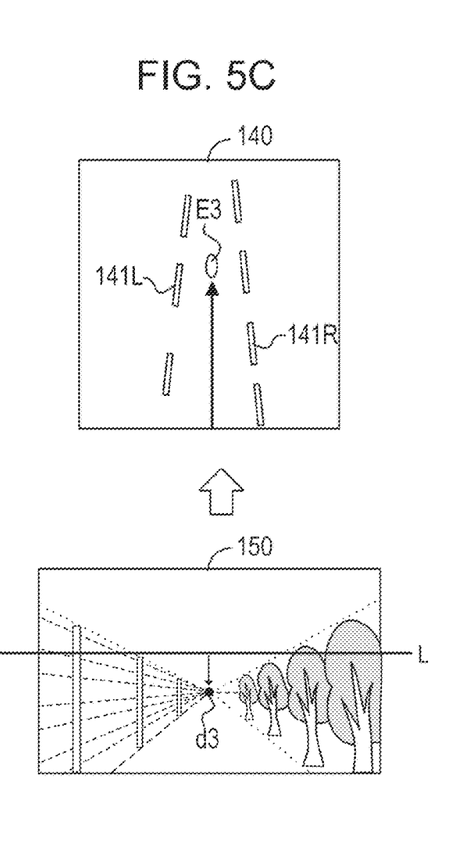

FIG. 50 illustrates a captured image 150 obtained when the vehicle 1 is pitching up or the vehicle 1 is traveling uphill and an overhead view 140 of the lane obtained when such a state is transformed to the real-space coordinate system. The captured image 150 includes a vanishing point d3, and the position of the vanishing point d3 changes to be located lower than the line L. In addition, the distance between left lane markings 141L and right lane markings 141R of the lane gradually decreases in the overhead view 140.

In the overhead view 100 of FIG. 5A, the permissible range for the distance ΔH between the center position Xc of the lane and the width-direction center position C of the vehicle 1 is sot to a range E1 in accordance with the width of the lane. In contrast, in the overhead view 120 of FIG. 5B, the permissible range for the distance ΔH between the center position Xc of the lane and the width-direction center position C of the vehicle 1 is set to a range E2 according to the width of the lane. Further, in the overhead view 140 of FIG. 5C, the permissible range for the distance ΔH between the center position Xc of the lane and the width-direction center position C of the vehicle 1 is set to a range E3 according to the width of the lane.

If pitching of the vehicle 1 or the incline of the road changes while the vehicle 1 is traveling on a straight road, the width of the lane recognized by the line recognizing unit 11 in the real-space coordinate system changes and the position of the vanishing points d1 to d3 in the vertical direction also changes in the captured images 110, 130, and 150; however, the position of the vanishing points d1 to d3 in the horizontal direction does not change. In contrast, if the road on which the vehicle 1 is traveling is not a straight road (is a curved road), the position of the vanishing points changes in the horizontal direction.

Accordingly, in STEP 3, the road condition determining unit 12 calculates the vanishing point flow (path in which the position of the vanishing point changes) in the time-series images captured by the camera 2. Then in the next step, i.e., STEP 4, the road condition determining unit 12 performs a process (first straight road determination process) in which it is determined that the road on which the vehicle 1 is traveling is a straight road if an amount of change of the vanishing point in the horizontal direction that is recognized from the vanishing point flow is smaller than or equal to a predetermined first value. The process then proceeds to STEP 5.

In STEP 10, the road condition determining unit 12 stores the current location of the vehicle 1 detected by the GPS unit 31 in the memory. In the next step, i.e., STEP 11, the road condition determining unit 12 performs map matching correction (processing for correcting the current location of the vehicle 1 to be on the most appropriate road by comparing the position of the vehicle 1 detected by the GPS unit 31 with the road on which the vehicle 1 has traveled) if necessary.

In the next step, i.e., STEP 12, the road condition determining unit 12 accesses the map database 32 to obtain map data of the road on which the vehicle 1 is traveling and performs a process (second straight road determination process) in which it is determined whether the road on which the vehicle 1 is traveling is a straight road on the basis of the map data of the road. The process then proceeds to STEP 5.

STEPs 5, 6, and 9 are processing performed by the lane keeping responsivity setting unit 14. In STEP 5, the lane keeping responsivity setting unit 14 determines whether the road on which the vehicle is traveling is determined to be a straight road through the first and second straight road determination processes.

If the road on which the vehicle 1 is traveling is determined to be a straight road through the first and second straight road determination processes, the process proceeds to STEP 6; otherwise, the process branches to STEP 9.

If the road on which the vehicle 1 is traveling is not determined to be a straight road through at least one of the first and second straight road determination processes (if it is expected that the road on which the vehicle 1 is traveling is not straight), the lane keeping responsivity setting unit 14 sets a control gain to a standard gain Gs. The control gain is used to calculate the control amount θa of the steering system 7 from the distance ΔH between the width-direction center position Xc of the lane and the width-direction center position C of the vehicle 1, and the control gain determines the responsivity of the lane keeping control to the distance ΔH.

On the other hand, if the road on which the vehicle 1 is traveling is determined to be a straight road through the first and second straight road determination processes (if it is expected that the vehicle 1 is traveling on a straight road), the lane keeping responsivity setting unit 14 sets the control gain, which is used to calculate the control amount θa of the steering system 7 from the distance ΔH between the width-direction center position Xc of the lane and the width-direction center position C of the vehicle 1, to a gain Gw that is smaller than the standard gain Gs in STEP 6.

Referring to FIG. 5A, in the overhead view 100, the permissible range E1 is set for the distance ΔH in accordance with the width between the left lane markings 101L and the right lane markings 101R, and the steering control unit 13 performs lane keeping control if the distance ΔH exceeds the permissible range E1.

Referring to FIG. 5B, in the overhead view 120, the permissible range E2 that is wider than the permissible range E1 in the horizontal direction is set in accordance with the width between the left lane markings 121L and the right lane markings 121R. Referring to FIG. 5C, in the overhead view 140, the permissible range E3 that is narrower than the permissible range E1 in the horizontal direction is set in accordance with the width between the left lane markings 141L and the right lane markings 141R.

As described above, the width of the lane recognized from the overhead views 100, 120, 140 changes although the vehicle 1 is traveling on a straight road. If the permissible range changes accordingly among E1 to E3, the control amount θa of the steering system 7 calculated in STEP 22 described above varies due to such a change in the lane keeping control execution condition. This variation consequently makes the behavior of the vehicle 1 unstable.

Accordingly, if it is determined in STEP 5 that the road on which the vehicle 1 is traveling is a straight road through both the first straight road determination process (STEP 4) and the second straight road determination process (STEP 12) (if it is expected that the vehicle 1 is traveling on a straight road), the gain used to calculate the control amount θa of the steering system 7 from the distance ΔH between the width-direction center position Xc of the lane and the width-direction center position C of the vehicle 1 is set to be smaller than the standard gain Gs in STEP 6. This setting successfully makes it less likely that the behavior of the vehicle 1 becomes unstable.

In STEP 7, the steering control unit 13 calculates the control amount θa of the steering system 7 by using the control gain Gs set in STEP 6 or the control gain Gw set in STEP 9. The process then ends in STEP 8.

3. Other Embodiments

In the embodiment described above, the road condition determining unit 12 performs the first straight road determination process based on the vanishing point flow and the second straight road determination process based on the map data. The road condition determining unit 12 may be configured to perform only one of the first straight road determination process and the second straight road determination process. In this case, one of the processing of STEPs 1 to 4 and the processing of STEPS 10 to 12 of FIG. 3 is performed, and it is determined in STEP 5 whether the road on which the vehicle 1 is traveling is a straight road based on the determination result obtained through the first straight road determination process or the second straight road determination process.

In addition, the lane keeping responsivity setting unit 14 may perform processing of reducing the control gain when both a condition indicating that the road on which the vehicle 1 is traveling is a straight road and a condition indicating that the distance ΔH between the center position Xc of the lane and the width-direction center position C of the vehicle 1 is smaller than or equal to a predetermined second value are met.

In addition, the lane recognizing unit 11 recognizes the lane where the vehicle 1 is traveling by extracting the lane markings on the road. The lane recognizing unit 11 may recognize the lane where the vehicle 1 is traveling by extracting ends of the roadway (such as boundaries between the roadway and the sidewalk).

Further, the lane keeping responsivity setting unit 14 may have the functions of the road condition determining unit 12. In this case, when the lane keeping responsivity setting unit 14 determines that the amount of change in the position of the vanishing point in the horizontal direction is smaller than or equal to a predetermined value on the basis of the vanishing point flow, the lane keeping responsivity setting unit 14 may reduce the control gain compared with the control gain set when the amount of change is larger than the predetermined value. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control device comprising:
a lane recognizing unit that recognizes, from an image captured by a camera mounted in a vehicle, a lane of a road where the vehicle is traveling;
a steering controller that performs lane keeping control to cause a steering system of the vehicle to operate to reduce a distance between a width-direction center position of the lane and a position where the vehicle is traveling in the lane by using a recognized state of the lane obtained by the lane recognizing unit;
a road condition determining unit that determines whether the road on which the vehicle is traveling is a straight road; and a lane keeping responsivity setting unit that sets, when it is determined by the road condition determining unit that the road on which the vehicle is traveling is a straight road, responsivity of the lane keeping control to be lower than responsivity set when it is determined by the road condition determining unit that the road on which the vehicle is traveling is not a straight road, wherein the responsivity of the lane keeping control is a responsivity of the steering controller to cause the steering system of the vehicle to operate to reduce the distance between the width-direction center position of the lane and the position where the vehicle is traveling in the lane, wherein when the responsivity is made lower, the vehicle is operated to travel closer to the center of the lane more slowly.

2. The vehicle control device according to claim 1, further comprising:

a vehicle location detection unit that detects a current location of the vehicle; and a map data obtaining unit that accesses a map database storing map data and obtains the map data, wherein the road condition determining unit determines whether the road on which the vehicle is traveling is a straight road by obtaining the map data including the current location of the vehicle detected by the vehicle location detection unit, through the map data obtaining unit.

3. The vehicle control device according to claim 1, wherein the road condition determining unit determines that the road on which the vehicle is traveling is a straight road when an amount of change in a position of a vanishing point of the road in a horizontal direction in time-series images captured by the camera is smaller than or equal to a predetermined first value.

4. The vehicle control device according to claim 1, wherein the lane keeping responsivity setting unit sets, when conditions are met, the responsivity of the lane keeping control to reduce the distance to be lower than responsivity set when the conditions are not met, wherein the conditions include:
(i) it is determined by the road condition determining unit that the road on which the vehicle is traveling is a straight road and
(ii) the distance is smaller than or equal to a predetermined second value.

5. The vehicle control device according to claim 1, wherein the position where the vehicle is traveling in the lane is determined by using a lane mark included in the image captured by the camera.

6. A vehicle control device comprising:

a lane recognizing unit that recognizes, from an image captured by a camera mounted in a vehicle, a lane of a road where the vehicle is traveling;

a steering controller that performs lane keeping control to cause a steering system of the vehicle to operate to reduce a distance between a width-direction center position of the lane and a position of the vehicle by using a recognized state of the lane obtained by the lane recognizing unit, while the vehicle is traveling on the road; and a lane keeping responsivity setting unit that sets, when an amount of change in a position of a vanishing point of the road in a horizontal direction in time-series images captured by the camera is smaller than or equal to a predetermined value, responsivity of the lane keeping control to be lower than responsivity set when the amount of change is larger than the predetermined value, wherein the responsivity of the lane keeping control is a responsivity of the steering controller to cause the steering system of the vehicle to operate to reduce the distance between the width-direction center position of the lane and the position where the vehicle is traveling in the lane, wherein when the responsivity is made lower, the vehicle is operated to travel closer to the center of the lane more slowly.

7. The vehicle control device according to claim 6, wherein the position of the vehicle while traveling on the road is determined by using a lane mark included in the image captured by the camera.

8. A vehicle control method comprising steps of:
(i) recognizing, from an image captured by a camera mounted in a vehicle, a lane of a road where the vehicle is traveling; and
(ii) performing, by using a computer, a lane keeping control to cause a steering system of the vehicle to operate to reduce a distance between a width-direction center position of the lane and a position where the vehicle is traveling in the lane by using a recognized state of the lane obtained by the step (i), wherein the step (ii) comprises determining whether the road on which the vehicle is traveling is a straight road, and setting, when it is determined that the road on which the vehicle is traveling is a straight road, responsivity of the lane keeping control to be lower than responsivity set when it is determined that the road on which the vehicle is traveling is not a straight road, wherein the responsivity of the lane keeping control is a responsivity to cause the steering system of the vehicle to operate to reduce the distance between the width-direction center position of the lane and the position where the vehicle is traveling in the lane, wherein when the responsivity is made lower, the vehicle is operated to travel closer to the center of the lane more slowly.

\* \* \* \* \*